Oct. 10, 1967    R. L. SHIGLEY ET AL    3,346,369
PROCESS FOR RECOVERING SILVER
Filed July 8, 1963

Russell L. Shigley
Robert A. Glenn
INVENTORS

BY Jack Lahr
ATTORNEY

United States Patent Office 3,346,369
Patented Oct. 10, 1967

3,346,369
PROCESS FOR RECOVERING SILVER
Russell L. Shigley, Silver Spring, Md., and Robert A. Glenn, Falls Church, Va., assignors to Research Silver Refining Company, Baltimore, Md., a corporation of Maryland
Filed July 8, 1963, Ser. No. 293,441
2 Claims. (Cl. 75—109)

The present invention has reference to a new and improved process for recovering silver from spent photographic solutions, such as fix and stop solutions.

Over the years, diverse apparatus have been developed for recovering silver carried in spent photographic solutions. Typically, such apparatus are used at a film processing plant which use various replenishing means, all known in the art.

The spent photographic solutions carrying the silver is generally carried off from a film processing tank by a suitable conduit to an apparatus which is operative to remove the silver. Such an apparatus carries various metals in the flow path which are higher than silver in the electromotive series, and the silver is deposited on this metal. The prior art teaches the use of steel or copper wool, metal turnings, wire, chips and the like interposed in the flow path of a confined chamber, typified by the U.S. patents to Quaglia, No. 2,194,056; Megesi No. 2,905,323.

The present invention contemplates a new and improved construction and arrangement of the metal carried within such a vessel, operative to effect a notably superior and efficient recovery of silver. The complex silver salts formed during film processing will yield the silver on contact with the metal (above silver in the electromotive series), which metal will go into solution in place of the silver.

According to this invention, it has been discovered that chunks of honeycomb metal (higher than silver in the electromotive series) affords a highly efficient replacement of silver from spent photographic solutions; advantageously this honeycomb metal is obtained by cutting up scrapped internal combustion engine radiators into small, generally rectangular chunks, and interposing such chunks in the flow path of a vessel through which photographic solution passes.

Another object of this invention is to provide a new and improved process for recovering silver from fixing solution wherein chunks of honeycomb metal, preferably brass internal combustion engine radiators affords the collecting surface for the silver.

Still further, this invention contemplates a new and improved method for recovering silver from photographic solutions which is reliable and trouble free in operation, capable of enhanced capacity, and notably inexpensive.

These and still further objects, advantages, and novel features of the present invention will become apparent in the specification and claims taken in connection with the accompanying drawing.

Figure 1:
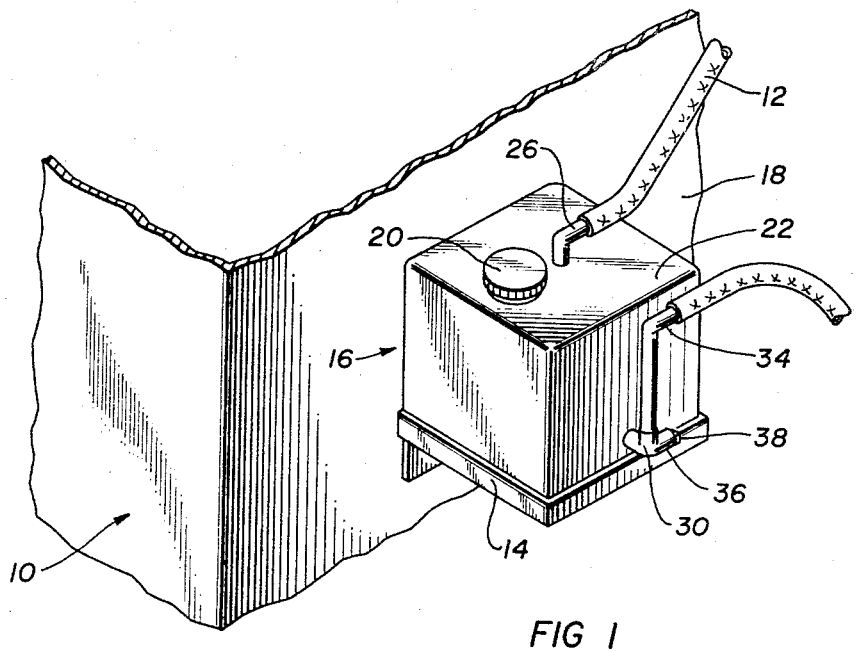
FIGURE 1 is a diagrammatic perspective view of the apparatus according to the present invention.
Figure 2:
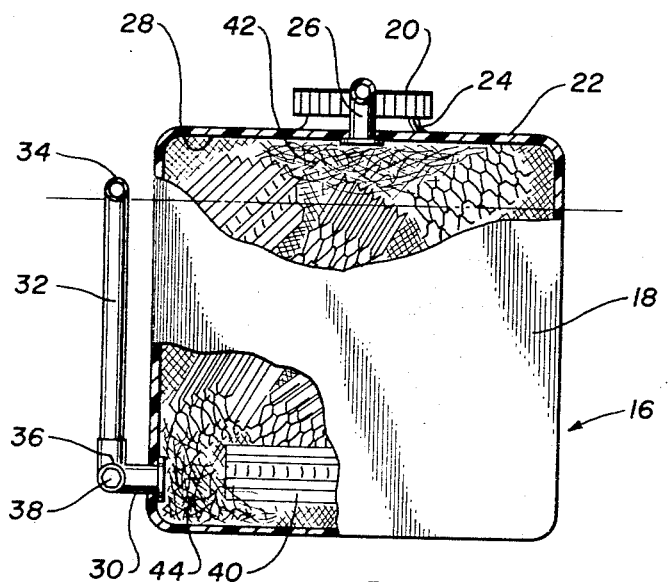
FIGURE 2 is an elevation section view of the apparatus in FIGURE 1.

Referring now to the drawings, there is shown a film processing tank 10 of conventional construction, having an overflow tube 12. Conveniently, the tank carries a bracket 14 on which is mounted the apparatus 16 according to this invention.

The apparatus 16 preferably takes the form of a rectangular vessel 18 of molded plastic construction. Other materials may be used, as is evident, and, if metal is used, it should be below silver in the electromotive series. The vessel 18 has removable closure fitting 20 on its top 22, such as a screw cap threadably engaged with a boss 24. An inlet fitting 26, preferably of plastic affords a connection with the conduit 12 and thereby directs the photographic solution into the enlarged chamber 28 of the vessel 18. The bottom of the vessel 18 has an outlet fitting 30 defining thereby a flow path through the vessel 18. The fitting 30 has an upwardly extending run to which is connected an L-shaped conduit 32, its uppermost leg 34 thereby defining the level of the solution within the vessel chamber 28. The fitting 30 has a lateral branch 36 carrying a conventional plug valve 38 for drainage purposes.

The vessel chamber 28 is filled with generally rectangular, random chunks 40 of honeycomb metal, preferably formed by cutting up scrapped automobile radiators, reclaimed from any available source. This metal is higher than silver in the electromotive series and is preferably brass. These chunks are deposited into the vessel chamber via the boss 24. Suitable filter material 42, 44 is carried within the vessel chamber 28 adjacent to the inlet and outlet fittings 26 and 30, respectively. Such non-metallic material as excelsior has been found most desirable for this purpose.

The configuration of these honeycomb chunks is such to afford a substantial surface area in contact with the photographic solution so that silver replaces the metal and is coated thereon. When this reaction is completed, the vessel chamber is drained via the plug valve 38, the chunks 40 are removed via the boss 24, and replaced with new chunks. Refining of the silver-coated chunks can then take place in the known manner.

EXAMPLE

A 12" x 12" x 12" vessel 18 was filled with chunks of a scrapped automotive radiator, the chunks varying in dimension between 1½" to 2" on a side. This installation was connected to the overflow line of an Eastman Kodak X-Omat automatic film processer No. 2 in a hospital X-ray department, and a test was run for fourteen days. The amount of silver in the spent photographic fixing solution varied between 0.75–1.9 ounces per gallon. Approximately 53 gallons of spent photographic fixing solution were passed through the vessel 18. The solution which passed through vessel 18 was measured for silver content; this measurement showed 0.003 ounce per gallon of silver.

While the preferred embodiment of the present invention has been disclosed, it will be apparent that alternatives will become evident to those skilled in the art. Therefore, the preferred embodiment of this invention is for purposes of illustration only, the scope of the invention being defined in the claims.

We claim:
1. Method of recovering silver from spent liquid solutions containing silver comprising the steps of:
   (a) recovering radiator core metal of honeycomb construction above silver in the electromotive series from an internal combustion engine;
   (b) cutting said core into chunks which substantially retain said honeycomb construction; and
   (c) passing the spent liquid solution containing silver through said chunks in a vessel whereby silver in the spent solution is deposited on the chunks.

2. Method defined in claim 1 wherein said chunks are cut to a minimum dimension of 1½ inches on a side.

References Cited

UNITED STATES PATENTS

| | | | |
|---|---|---|---|
| 1,947,938 | 2/1934 | Hey | 75—109 X |
| 2,194,056 | 3/1940 | Quaglia | 75—109 |
| 2,630,227 | 3/1953 | Rodwell | 210—489 X |
| 2,643,108 | 6/1953 | Lieberman | 75—109 X |
| 2,905,323 | 9/1959 | Megesi | 210—130 |
| 3,035,701 | 5/1962 | May | 210—314 X |
| 3,169,112 | 2/1965 | Nelson | 210—446 X |

REUBEN FRIEDMAN, *Primary Examiner.*

J. DE CESARE, *Assistant Examiner.*